(12) United States Patent
Ishibashi

(10) Patent No.: US 9,552,332 B2
(45) Date of Patent: Jan. 24, 2017

(54) INFORMATION PROCESSING APPARATUS HAVING IMPROVED PREVIEW FUNCTION

(71) Applicant: Masayuki Ishibashi, Hekinan (JP)

(72) Inventor: Masayuki Ishibashi, Hekinan (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 417 days.

(21) Appl. No.: 13/837,771

(22) Filed: Mar. 15, 2013

(65) Prior Publication Data

US 2013/0246915 A1 Sep. 19, 2013

(30) Foreign Application Priority Data

Mar. 19, 2012 (JP) .................................. 2012-062086

(51) Int. Cl.
*G06F 17/22* (2006.01)
*G06F 17/21* (2006.01)
*G06F 3/12* (2006.01)

(52) U.S. Cl.
CPC ........... *G06F 17/212* (2013.01); *G06F 3/1208* (2013.01); *G06F 3/1256* (2013.01); *G06F 3/1284* (2013.01)

(58) Field of Classification Search
CPC .... G06F 17/212; G06F 3/1256; G06F 3/1284; G06F 3/1208
USPC ........................................................ 715/274
See application file for complete search history.

(56) References Cited

U.S. PATENT DOCUMENTS

| | | | |
|---|---|---|---|
| 6,616,359 B1 * | 9/2003 | Nakagiri ................ | G06K 15/00 400/582 |
| 7,064,858 B2 * | 6/2006 | Iwai ........................ | G06K 15/02 345/629 |
| 8,630,010 B2 * | 1/2014 | Iida ........................ | G06K 15/005 358/1.13 |
| 8,670,150 B2 * | 3/2014 | Tomomatsu ........... | G06K 15/00 358/1.15 |
| 9,134,932 B2 * | 9/2015 | Shiraga ................. | G06F 3/1205 |
| 2002/0054301 A1 | 5/2002 | Iwai et al. | |
| 2003/0007179 A1* | 1/2003 | Ferlitsch ............... | G06F 3/1215 358/1.16 |
| 2003/0103221 A1 | 6/2003 | Natori | |
| 2003/0103227 A1 | 6/2003 | Tomomatsu | |

(Continued)

FOREIGN PATENT DOCUMENTS

| | | | |
|---|---|---|---|
| JP | 2001134411 A | 5/2001 | |
| JP | 2002055802 A | 2/2002 | |

(Continued)

OTHER PUBLICATIONS

Jan. 19, 2016—(JP) Office Action—App 2012-062086.

*Primary Examiner* — Maikhanh Nguyen
(74) *Attorney, Agent, or Firm* — Banner & Witcoff, Ltd.

(57) ABSTRACT

There is provided a non-transitory computer-readable medium having a computer program stored thereon and readable by a computer that is installed in an information processing apparatus, the computer program, when executed by the computer, causes the information processing apparatus to operate as: a preview data generation unit configured to acquire image data of a print job using a RAW spool type and to generate preview data from the image data, wherein the preview data is image data for preview; and a display unit configured to start up a previewer when the preview data of at least one page is generated and to display the preview data on the previewer.

13 Claims, 14 Drawing Sheets

(56) References Cited

U.S. PATENT DOCUMENTS

| | | | |
|---|---|---|---|
| 2004/0122932 A1* | 6/2004 | Mickeleit | G06F 3/1204 709/223 |
| 2007/0109581 A1 | 5/2007 | Saitoh | |
| 2007/0244580 A1* | 10/2007 | Ahne | H04N 1/00236 700/83 |
| 2008/0170264 A1* | 7/2008 | Nino | H04N 1/00238 358/1.17 |
| 2008/0316526 A1* | 12/2008 | Matsuzaki | H04N 1/00408 358/1.15 |
| 2010/0027059 A1* | 2/2010 | Ebi | H04N 1/0035 358/1.15 |
| 2011/0273740 A1* | 11/2011 | Yang | G06F 3/1256 358/1.15 |
| 2012/0036432 A1* | 2/2012 | Mizoguchi | G06F 3/1208 715/274 |

FOREIGN PATENT DOCUMENTS

| | | |
|---|---|---|
| JP | 2003167701 A | 6/2003 |
| JP | 2003167721 A | 6/2003 |
| JP | 2007157121 A | 6/2007 |
| JP | 2012037933 A | 2/2012 |

* cited by examiner

INFORMATION PROCESSING APPARATUS HAVING IMPROVED PREVIEW FUNCTION

CROSS-REFERENCE TO RELATED APPLICATIONS

This application claims priority from Japanese Patent Application No. 2012-062086 filed on Mar. 19, 2012, the entire subject matters of which are incorporated herein by reference.

TECHNICAL FIELD

The invention relates to a program and an information processing apparatus. More specifically, the invention relates to a program and an information processing apparatus having a preview function of displaying preview data that is image data of an image to be printed on a sheet.

BACKGROUND

There have been known a preview function which displays preview data on a previewer before executing printing by a printing apparatus. For example, in an information processing apparatus having Microsoft Windows (registered trademark) installed therein, a printer driver has an independent spooler, separately from a spooler of the operating system (OS), and a preview function is implemented using the independent spooler. Further, in another information processing apparatus, although the spooler of the OS is used, a file is read out from the spooler and a file for preview is generated.

For example, there have been disclosed a related-art technology which implements a preview function in following order. First, when the OS receives a print instruction from an application, document data of a print target is converted into intermediate data, which is then stored in an EMT (Enhanced Metafile) spooler. When a print instruction is additionally received, a previewer is started up. After that, the previewer requests a print processor, which is provided by the printer driver, to generate preview data for preview, and the print processor reads out the data of a preview target from an EMF spool file and enables a printer graphics driver, which is provided by the printer driver, to generate preview data. The previewer receives a notification of completion of the generation of the preview data and displays the preview data.

SUMMARY

Illustrative aspects of the invention provide a program and an information processing apparatus in which processing from starting up a previewer to a display of preview data is simple.

According to one illustrative aspect of the invention, there is provided a non-transitory computer-readable medium having a computer program stored thereon and readable by a computer that is installed in an information processing apparatus, the computer program, when executed by the computer, causes the information processing apparatus to operate as: a preview data generation unit configured to acquire image data of a print job using a RAW spool type and to generate preview data from the image data, wherein the preview data is image data for preview; and a display unit configured to start up a previewer when the preview data of at least one page is generated and to display the preview data on the previewer.

According to another illustrative aspect of the invention, there is provided an information processing apparatus comprising: a control device configured to provide: a previewer configured to display preview data, which is image data of an image to be printed on a sheet by a printing apparatus; a preview data generation unit configured to acquire image data of a print job using a RAW spool type and to generate preview data for the previewer from the image data; and a display unit configured to start up the previewer upon the preview data of at least one page is generated and to display the preview data on the previewer.

DETAILED DESCRIPTION

<General Overview>

Figure 1:
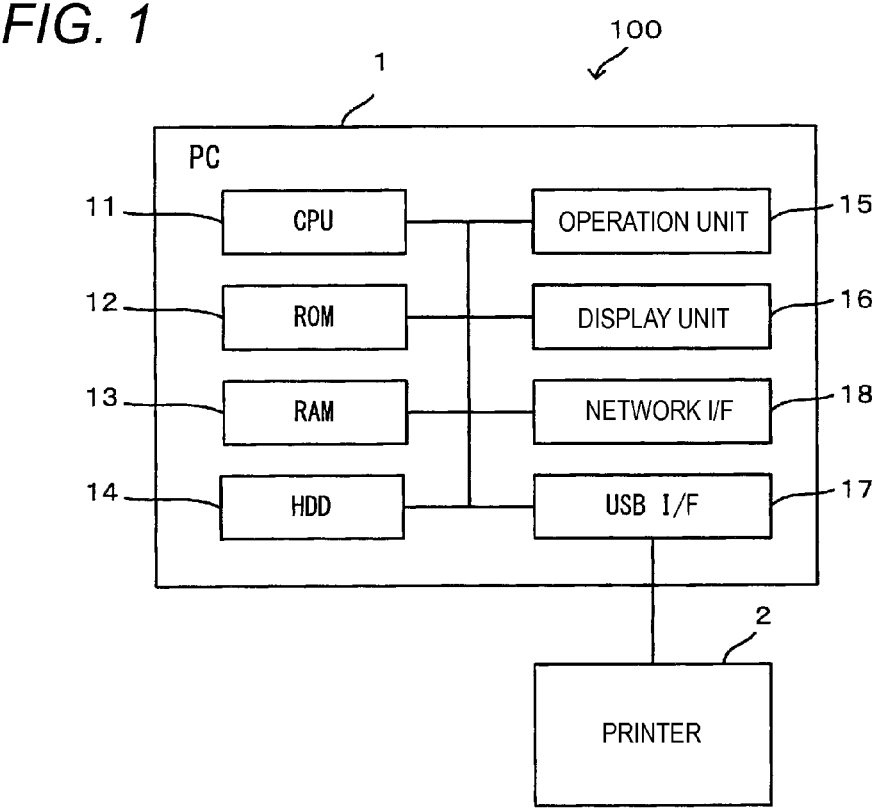
FIG. 1 is a block diagram showing a configuration of a print system according to an exemplary embodiment.

According to the above-described related-art technology, the previewer requests the generation of the preview data, the dedicated print processor receives the request and reads out the data of a preview target stored in the EMF spool file, and then the previewer waits for the generation completion of the preview data. That is, after the previewer is started up, the generation of the preview data starts. After the preview data is generated, the generation completion of the preview data is notified and then the preview data is displayed on the previewer. Like this, the processing from the starting up the previewer to the display of the preview data is complicated.

Therefore, illustrative aspects of the invention provide a program and an information processing apparatus in which processing from starting up a previewer to a display of preview data is simple.

According to one illustrative aspect of the invention, there is provided a non-transitory computer-readable medium having a computer program stored thereon and readable by a computer that is installed in an information processing apparatus, the computer program, when executed by the computer, causes the information processing apparatus to operate as: a preview data generation unit configured to acquire image data of a print job using a RAW spool type and to generate preview data from the image data, wherein the preview data is image data for preview; and a display unit configured to start up a previewer when the preview data of at least one page is generated and to display the preview data on the previewer.

The program disclosed in the present specification generates the preview data for preview, based on the image data of the print job using the RAW spool type. The preview data may have a data format that can be displayed on the previewer. For example, bitmap data or compression data thereof may be adopted. The preview data is stored in a file for preview data, separately from a file that is generated by an OS when using the RAW spool type. The program starts up the previewer when the preview data of at least one page is generated. The program displays the generated preview data on the previewer.

That is, according to the program disclosed in the specification, when displaying the print preview, the print job using the RAW spool type is targeted, and the generation of the preview data starts without receiving a request from the previewer. The program starts the previewer after generating the preview data, and the previewer reads out and displays the preview data stored in the file for preview data. That is, when displaying the preview data on the previewer, it is not necessary to issue a request for generation of the preview data from at least the previewer. As a result, the processing becomes simple.

According to another illustrative aspect of the invention, in the non-transitory computer-readable medium, wherein the computer program, when executed by the computer, causes the information processing apparatus to operate as: a print data generation unit configured to acquire the image data of the print job using the RAW spool type and to generate print data for a printing apparatus from the image data; and an output unit configured to receive a print instruction of the preview data being displayed on the previewer and to output print data corresponding to the preview data to the printing apparatus when the print instruction is received.

The print data may be PDL data, for example. This print data is also stored in a file for print data which is separate from a file that is generated by an OS when using the RAW spool type. According to this configuration, the print data is also prepared from the acquired image data and the previewer has a function of transmitting the print data. Therefore, it is not necessary to again input a print start instruction from an application, so that the usability of a user is improved.

According to still another illustrative aspect of the invention, in the non-transitory computer-readable medium, wherein the computer program, when executed by the computer, causes the information processing apparatus to operate as: a determination unit configured to determine whether there is an instruction of preview display for the image data; and a control unit configured to: control the print data generation unit to generate the print data with the RAW spool type when the determination unit determines that there is an instruction of preview display; and control the print data generation unit to generate the print data with a spool type designated in the print job when the determination unit determines that there is no instruction of preview display.

When not displaying the preview, it is preferable to generate the print data in accordance with the designated spool type.

According to still another illustrative aspect of the invention, in the non-transitory computer-readable medium, wherein the output unit is configured to receive a print instruction in a sheet unit and to output print data corresponding to preview data of a sheet, for which the print instruction is received, to the printing apparatus.

The print instruction can be made in a sheet unit, so that the convenience of the preview is increased.

According to still another illustrative aspect of the invention, in the non-transitory computer-readable medium, wherein the display unit is configured to start up the previewer upon all preview data of the print job is generated.

According thereto, the preview data of one job can be collectively displayed. Thus, the processing of displaying the preview data on the previewer every time when the preview data of one page is generated is not necessary, so that the processing becomes simpler.

According to still another illustrative aspect of the invention, in the non-transitory computer-readable medium, wherein the computer program, when executed by the computer, causes the information processing apparatus to operate as: a notification unit configured to notify a user of information indicating that the preview data is being generated after the image data of the print job using the RAW spool type is acquired until the generation of preview data is completed.

By notifying the above information, the anxiety of a user until the preview data is displayed can be reduced.

According to still another illustrative aspect of the invention, in the non-transitory computer-readable medium, wherein the information notified by the notification unit comprises progressing of a generation status of the preview data in the whole print job, and wherein the computer program, when executed by the computer, causes the information processing apparatus to operate as: an update unit configured to update the progressing that is notified by the notification unit every time when the preview data of at least one page is generated.

By notifying the above progressing, the anxiety of a user until the preview data is displayed can be further reduced.

According to still another illustrative aspect of the invention, there is provided an information processing apparatus comprising: a control device configured to provide: a previewer configured to display preview data, which is image data of an image to be printed on a sheet by a printing apparatus; a preview data generation unit configured to acquire image data of a print job using a RAW spool type and to generate preview data for the previewer from the image data; and a display unit configured to start up the previewer upon the preview data of at least one page is generated and to display the preview data on the previewer.

According to the invention, it is possible to implement a program and an information processing apparatus in which processing from starting up a previewer to a display of preview data is simple.

Exemplary Embodiments

Hereinafter, exemplary embodiments of an image forming apparatus of the invention will be specifically described with reference to the accompanying drawings. In the exemplary embodiment, the invention is applied to a PC having a printer driver for generating print data installed therein (hereinafter, which is simply referred to as 'PC').

[Configuration of Print System]

As shown in FIG. 1, a print system 100 according to this exemplary embodiment includes a printer 2 (which is one example of a printing apparatus) and a PC 1 (which is one example of an information processing apparatus) configured to control the printer 2. In the print system 100, the PC 1 and the printer 2 are connected to each other through a USB cable.

Incidentally, the printer and the PC configuring the print system 100 are not limited to one, respectively. That is, a plurality of printers and PCs may be connected. Further, the connection between the PC 1 and the printer 2 is not limited to the USB cable and may be made by other serial communication cable, a parallel communication cable, a wired LAN cable, a wireless communication route such as wireless LAN, and the like.

The PC 1 has a CPU 11 configured to execute a variety of processing, a ROM 12 configured to store therein a program (BIOS) of starting processing, which is executed by the CPU 11 when the PC 1 starts up, a RAM 13 that is used as a temporary storage area when the CPU 11 executes the variety of processing and a hard disk drive (HDD) 14 configured to store therein a variety of programs and data.

The PC 1 includes: an operation unit 15 including a keyboard, a mouse and the like; a display unit 16 consisting of a liquid crystal monitor and the like; a USB interface 17; and a network interface 1.

Figure 2:
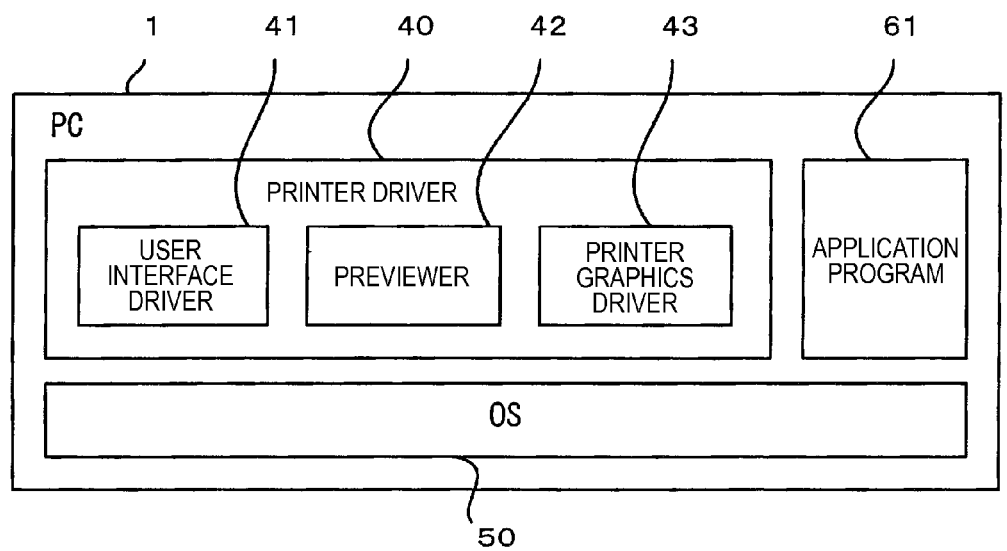
FIG. 2 is a block diagram showing a configuration of a program that is installed in a PC.

As shown in FIG. 2, the HDD 14 of the PC 1 stores therein an operating system (OS) 50, an application program 61 (word-processing software, drawing software, spreadsheet software, photo data editing software and the like) and a printer driver 40 (which is one example of a program) that controls the printer 2.

The application program 61 installed in the PC 1 has a function of outputting a print command to the printer driver 40. By the print function, image data that becomes a document image is transferred to the printer driver 40. Based on the image data of a print target, the printer driver 40 generates print data of a PDL format that is required for printing in the printer 2.

The print data prepared by the printer driver 40 is transmitted to the printer 2 via the USB interface 17. The printer 2 receives the print data and forms an image on a sheet on the basis of the print data.

For the printer 2, a printer having a function of forming an image on a sheet may be used. The image forming method may be an electrophotographic method, an inkjet method or the other general image forming method. Further, the printer may form a color image and a monochrome image or form only a monochrome image.

The printer driver 40 according to this exemplary embodiment has a preview function of displaying preview data, which is image data of an image to be printed on a sheet, on the PC 1 before transmitting print data. The printer driver 40 of this exemplary embodiment also has a function of performing a setting indicating whether or not to display a print preview.

Specifically, when displaying a print preview, the printer driver 40 of this exemplary embodiment starts up a previewer 42 before transmitting print data to the printer 2. Then, the printer driver 40 displays the preview data on the previewer 42. On the other hand, when not displaying the print preview, the printer driver 40 transmits the print data to the printer 2 without starting up the previewer 42. The printer driver 40 will be specifically described later.

Incidentally, the printer driver 40, not the application program 61, has the preview function of the specification. The processing, for example, intensive print such as 2 in 1 and watermark print, may be performed when the printer driver 40 generates print data, and the processing that is performed by the printer driver 40 is not reflected in a preview of the application program 61. The preview by the printer driver 40 can display preview data reflecting the processing that is performed by the printer driver 40.

[Configuration of Printer Driver]

Subsequently, a configuration of the printer driver 40 will be described with reference to FIG. 2. Incidentally, it is assumed that Microsoft Windows (registered trademark) is installed in the PC 1 as the operating system (OS) 50.

The printer driver 40 (which is one example of a display unit and an output unit) includes: a user interface driver 41 enabling a user input about a variety of settings relating to a print job; a previewer 42 configured to display a print image on the display unit 16; and a printer graphics driver 43 (which is one example of a preview data generation unit and a print data generation unit) configured to generate print data, which is data for the printer 2, and preview data, which is data for the previewer 42.

Figure 3:
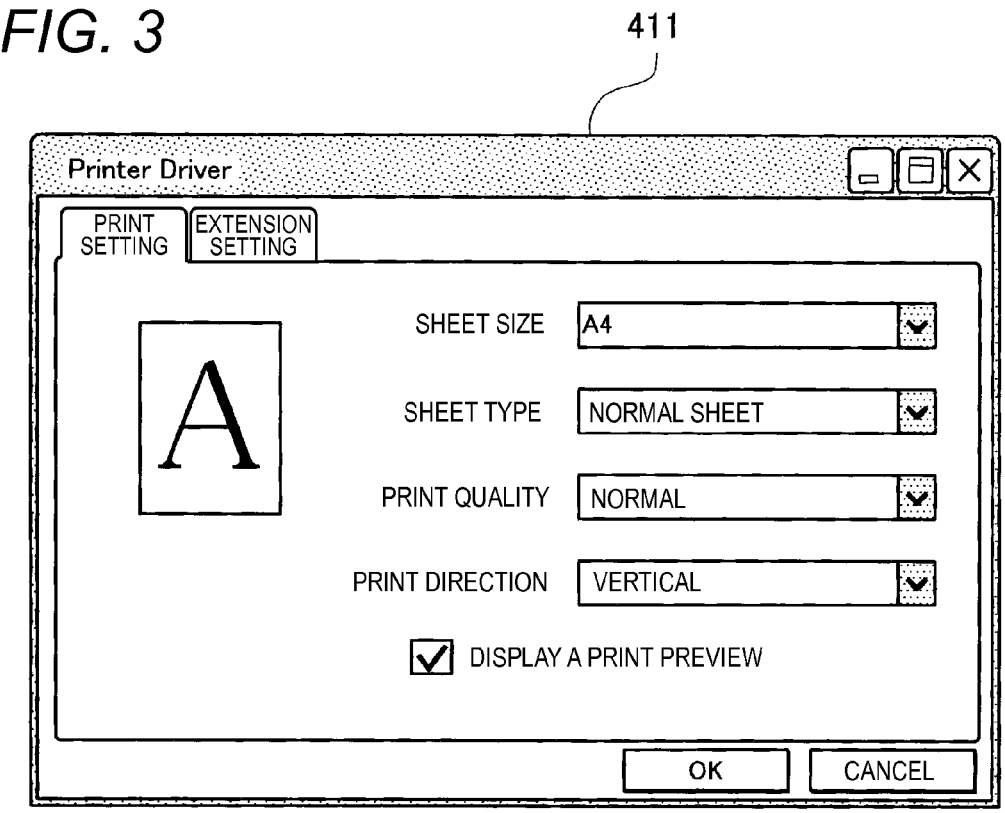
FIG. 3 shows a configuration of a print setting screen.

Specifically, the user interface driver 41 provides a print setting screen 411. As shown in FIG. 3, the print setting screen 411 enables a user to set a variety of attributes upon printing. In the print setting screen 411, it is possible to set the general print settings such as sheet size, sheet type, printing quality, printing direction and the like and to set whether or not to display a print preview.

When the setting for displaying a print preview is checked (hereinafter, a checked case is indicated with 'ON' and a non-checked case is indicated with 'OFF'), the printer driver 40 starts up the previewer 42 before transmitting the print data to the printer 2 and displays the preview data on the previewer 42. Then, the printer driver 40 receives an instruction indicating whether or not to perform a printing operation in the previewer 42. When a printing instruction, which instructs a printing operation, is input, the printer driver 40 transmits the print data from the previewer 42 to the printer 2. On the other hand, when the setting for displaying a print preview is OFF, the printer driver 40 transmits the print data to the printer without starting up the previewer 42.

Figure 4:
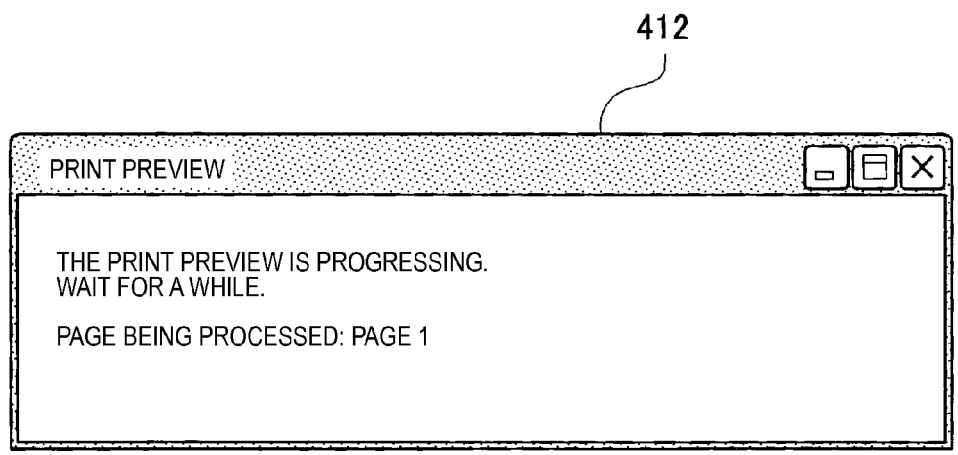
FIG. 4 shows a display example of a message box displaying a progressing status.

The user interface driver 41 provides a variety of message boxes, in addition to the print setting screen 411. Specifically, when the setting for displaying a print preview is ON, the user interface driver 41 starts a progressing message box 412 (which is one example of a notification unit) that displays generation progressing of the preview data, as shown in FIG. 4.

When the setting for displaying a print preview is ON, the user interface driver 41 starts up the previewer 42. The starting timing of the previewer 42 will be described later.

Figure 5:
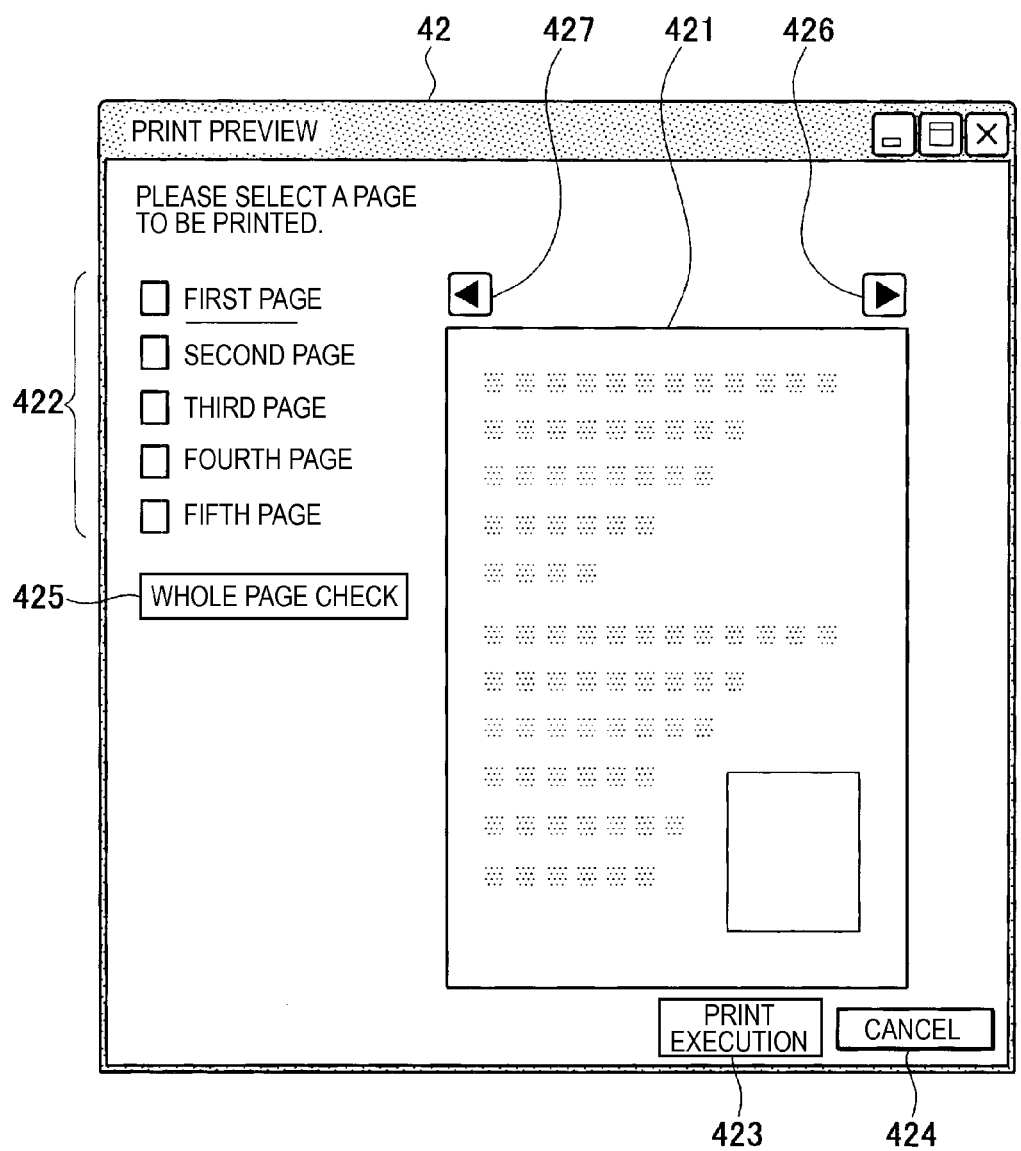
FIG. 5 shows a configuration of a previewer.

As shown in FIG. 5, the previewer 42 includes: an image area 421 that displays preview data of one page (which corresponds to one sheet); a page selection check box group 422 that sets whether or not to set each page (sheet) as a print target; a print execution button 423 that receives a print instruction of a page set as a print target; a cancel button 424 that stops a print job; a whole page check button 425 that sets all pages displayed in the page selection check box group 422 as a print target; a next page button 426 that receives an instruction of displaying preview data of a next page in the image area 421; and a previous page button 427 that receives an instruction of displaying preview data of a previous page in the image area 421.

A page number of the page selection check box group 422, which is being displayed in the image area 421, is underlined. Thereby, a user can know a page number that is being displayed in the image area 421. Check boxes corresponding to the number of generated preview data are displayed in the page selection check box group 422, so that a user can know the total number of pages constituting the print job. When the whole page check button 425 is pressed, all the check boxes of the respective pages displayed in the page selection check box group 422 are checked. When the print execution button 423 or cancel button 424 is pressed, the previewer 42 is ended.

The printer graphics driver 43 is configured to perform: a processing treatment of image data becoming a print target; processing of generating preview data of a physical sheet unit, based on the image data in which the processing treatment has been reflected; and processing of generating print data of a physical sheet unit, based on the image data in which the processing treatment has been reflected. The processing treatment includes synthesis of a watermark, a header, a footer and the like, magnification change such as enlargement and reduction and intensiveness such as 2 in 1 and 4 in 1.

A file format of the preview data may be arbitrary insomuch as it can be displayed on the previewer 42. In this exemplary embodiment, a compression file (for example, JPEG file) that is obtained by compressing a file of a bitmap format is adopted. Incidentally, a file format of the preview data may include a non-compressed bitmap file. Further, a file format of the print data may be arbitrary insomuch as it can be printed with the printer 2. In this exemplary embodiment, a PDL file is adopted.

The application program 61 in FIG. 2 is a program having a print instruction function. The application program 61 is configured to prepare image data becoming a print target and output the image data to the OS 50 when a print instruction is received from a user.

Figure 6:
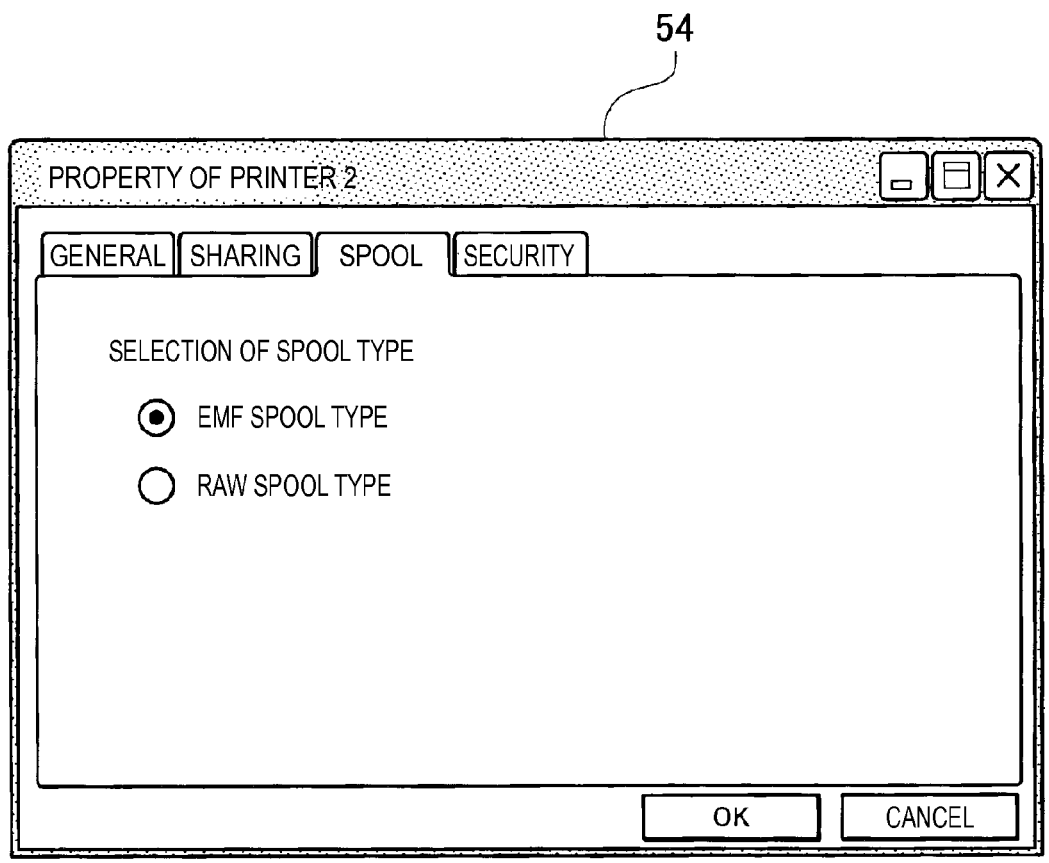
FIG. 6 shows a configuration of a printer property screen.

In addition to the printer driver for the printer 2, the PC 1 includes driver programs for a variety of devices installed therein, which provide screens for setting attributes of respective devices. For example, the screen for the printer 2 provided by the OS 50 includes a property screen 54 as shown in FIG. 6. The property screen 54 is displayed by displaying a list of printers in a start menu, selecting the printer 2 (printer driver 40) and pointing a property display. In the property screen 54, it is possible to make a setting of whole functions, a setting of sharing, a setting of security and a setting of a spool type. When a user makes a setting in the property screen 54, the printer driver 40 basically operates in response to the setting content.

In this exemplary embodiment, for the spool type, it is possible to set any one of an EMF spool type and a RAW spool type. In the property screen 54, a spool type for which a radio button has been selected is set. Specifically, in the EMF spool type, the OS 50 generates intermediate data (in this exemplary embodiment, universal print data that is generated by the OS 50 and does not depend on a type of a printer), and the printer driver 40 generates print data for the printer 2 from the intermediate data and transmits the generated print data to the printer 2. On the other hand, in the RAW spool type, the OS 50 does not generate intermediate data and the printer driver 40 generates and transmits print data to the printer 2.

[Printing Sequence]

[Outline]

Subsequently, a printing sequence of the print system 100 according to this exemplary embodiment will be described.

Figure 7:
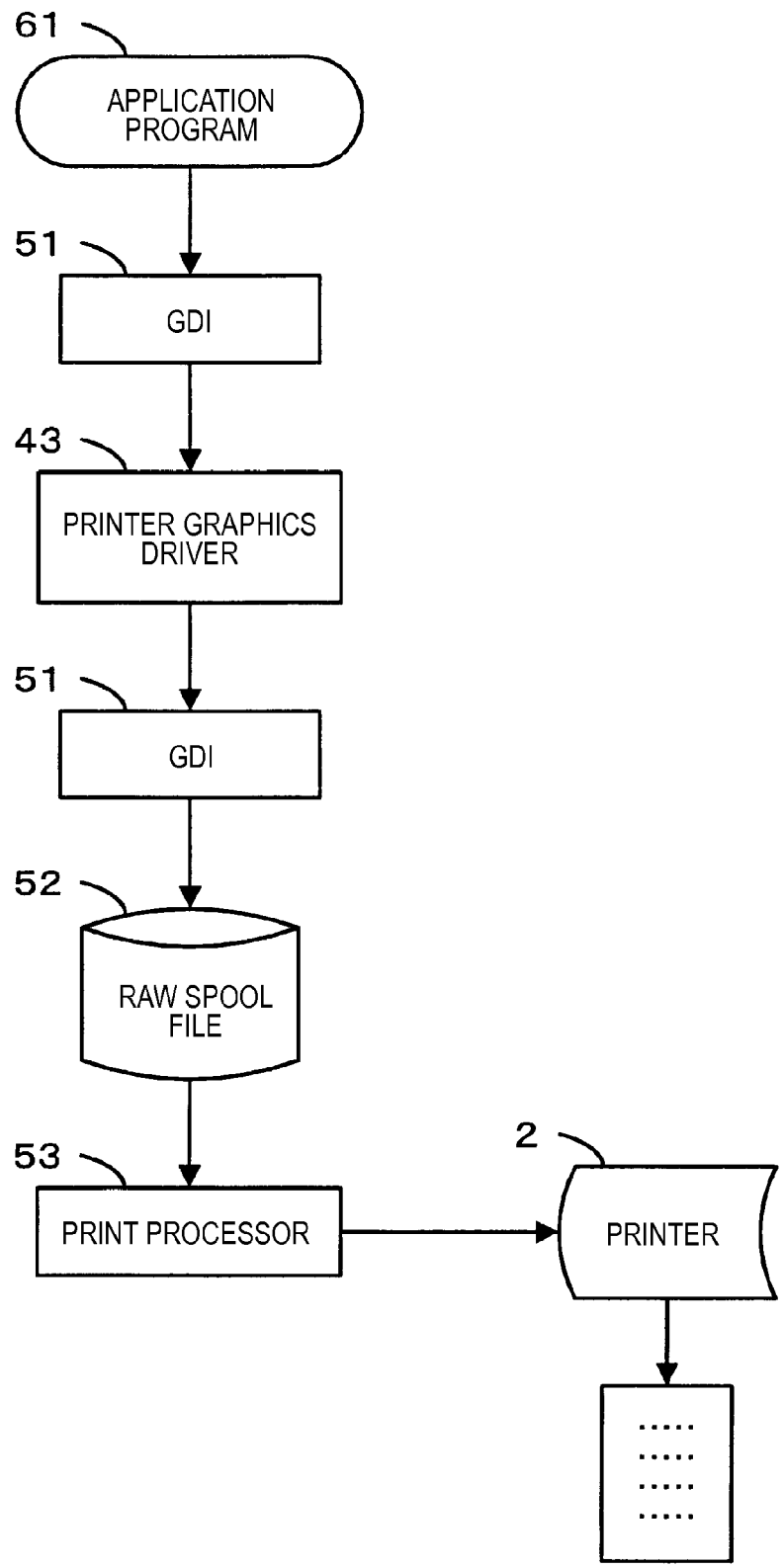
FIG. 7 is a block diagram showing a sequence of outputting print data in a RAW spool type.
Figure 8:
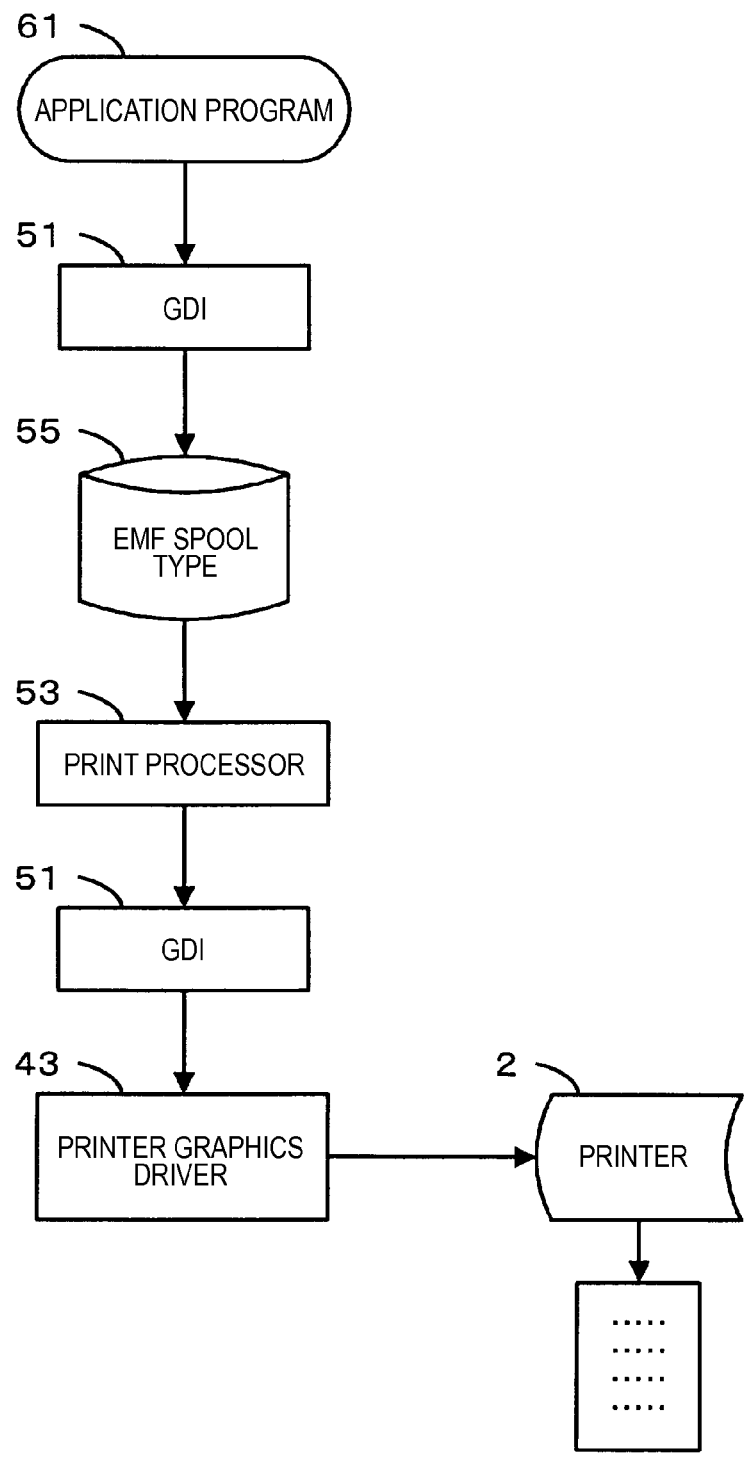
FIG. 8 is a block diagram showing a sequence of outputting print data in an EMF spool type.

In the print system 100, sequences of transmitting print data to the printer 2 are different when the printing is performed in the RAW spool type and when the printing is performed in the EMF spool type. FIG. 7 shows a sequence when the printing is performed in the RAW spool type. FIG. 8 shows a sequence when the printing is performed in the EMF spool type.

In FIGS. 7 and 8, a GDI 51 is a module that controls an output device such as a printer and a display. The GDI 51 is provided as a part of the OS 50. The GDI 51 is configured to receive a command from the application program 61, convert the command into data (bitmap data, in this exemplary embodiment) that the device driver (the printer driver 40, in this exemplary embodiment) can analyze, and transfer the data to the device driver.

The print processor 53 is a module having functions of outputting print data to the printer 2 and instructing the printer driver 40 to generate print data. The print processor 53 is provided as a part of the OS 50, like the GDI 51. The print processor 53 plays different roles in the RAW spool type and the EMF spool type.

Incidentally, the two GDIs 51 are shown in FIGS. 7 and 8. However, the two GDIs are shown for convenient explanations and are actually the same.

[RAW Spool Type]

When performing a printing operation with the RAW spool type, as shown in FIG. 7, the application program 61 first receives a print instruction from a user and outputs a print start notification. Then, the GDI 51 that is a part of the OS 50 receives the print start notification from the application program 61 and starts to acquire image data from the application program 61.

When the GDI 51 starts to acquire the image data, the GDI converts the image data into bitmap data and issues a drawing command to the printer graphics driver 43. When the printer graphics driver 43 receives the drawing command, the printer graphics driver acquires the converted image data from the GDI 51, generates print data for the printer 2, based on the image data, and transmits the generation completion to the GDI 51. The GDI 51 stores the generated print data in a RAW spool file 52 that is provided by the OS 50.

When the print data is stored in the RAW spool file 52, the print processor 53 starts and transmits the print data stored in the RAW spool file 52 to the printer 2. The printer 2 having received the print data performs a printing operation, based on the print data.

[EMF Spool Type]

When performing a printing operation with the EMF spool type, as shown in FIG. 8, the application program 61 first receives a print instruction from a user and outputs a print start notification, like the RAW spool type. Then, the GDI 51 receives the print start notification from the application program 61 and acquires image data from the application program 61.

Then, the GDI 51 converts the image data into intermediate data. Here, the intermediate data means data having a data format that is written using a GDI drawing command of the Windows (registered trademark) and that does not depend on a type of a printer. Then, the GDI 51 stores the converted intermediate data in an EMF spool file 55 that is provided by the OS 50.

When the intermediate data is stored in the EMF spool file 55, the print processor 53 is started up. The print processor 53 transfers the intermediate data stored in the EMF spool file 55 to the GDI 51.

When the GDI 51 acquires the intermediate data, the GDI converts the intermediate data into bitmap data and issues a drawing command to the printer graphics driver 43. When the printer graphics driver 43 receives the drawing command, the printer graphics driver acquires the converted intermediate data from the GDI 51 and generates print data for the printer 2, based on the intermediate data. Then, the printer graphics driver 43 transmits the print data to the printer 2 by using the output function of the OS 50. The printer 2 having received the print data performs a printing operation, based on the print data.

[Print Preview]

First Exemplary Embodiment

Subsequently, a printing sequence of displaying the print preview and then transmitting the print data to the printer 2 according to a first exemplary embodiment will be described with reference to a block diagram of FIG. 9 and a sequence diagram of FIG. 10. In the print system 100 of this exemplary embodiment, the preview function is implemented using the RAW spool type. Therefore, when the EMF spool type is designated, the spool type is changed to the RAW spool type by the printer driver 40 and then the preview function is implemented.

Figure 9:
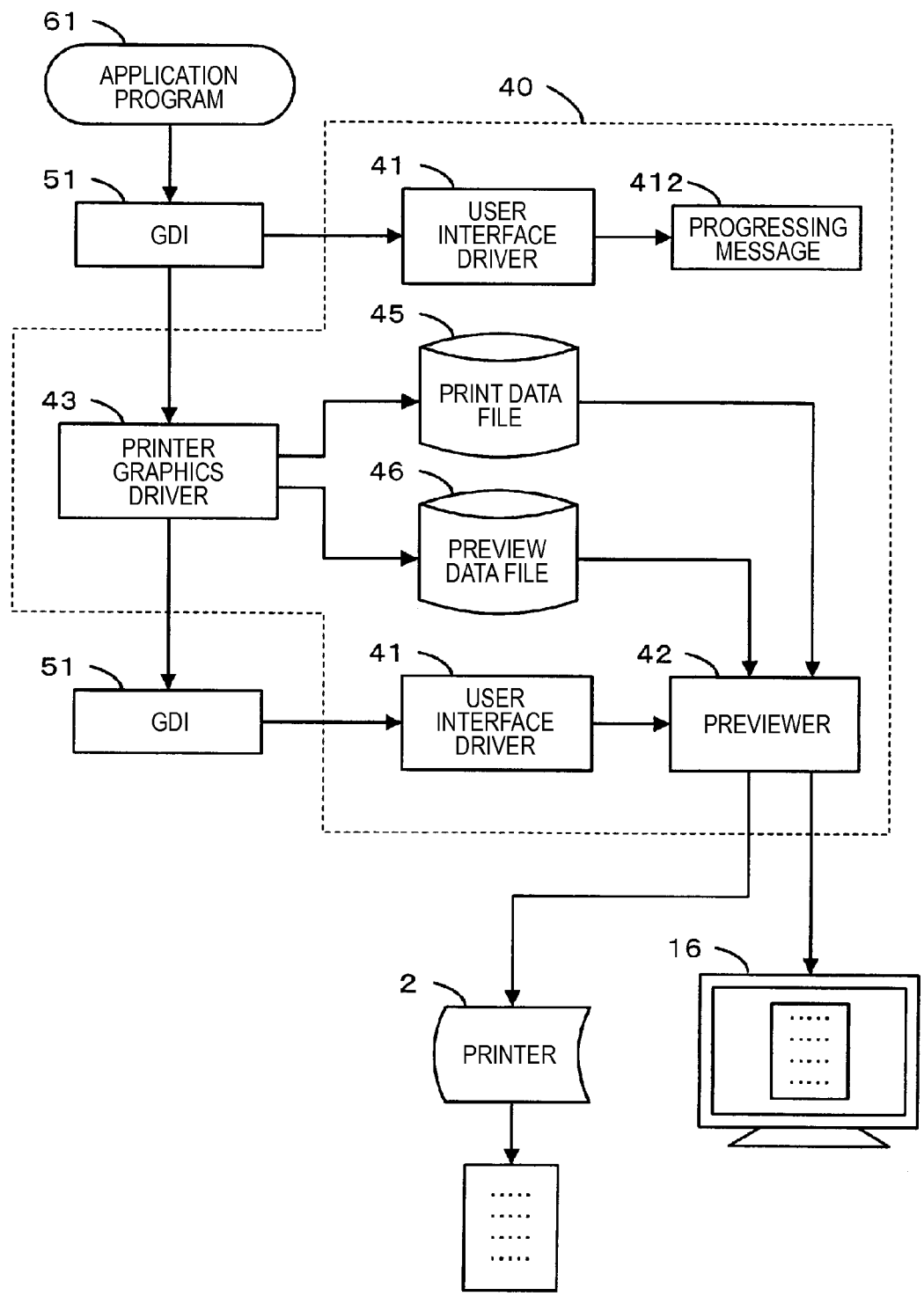
FIG. 9 is a block diagram showing a sequence of outputting print data when using a print preview.
Figure 10:
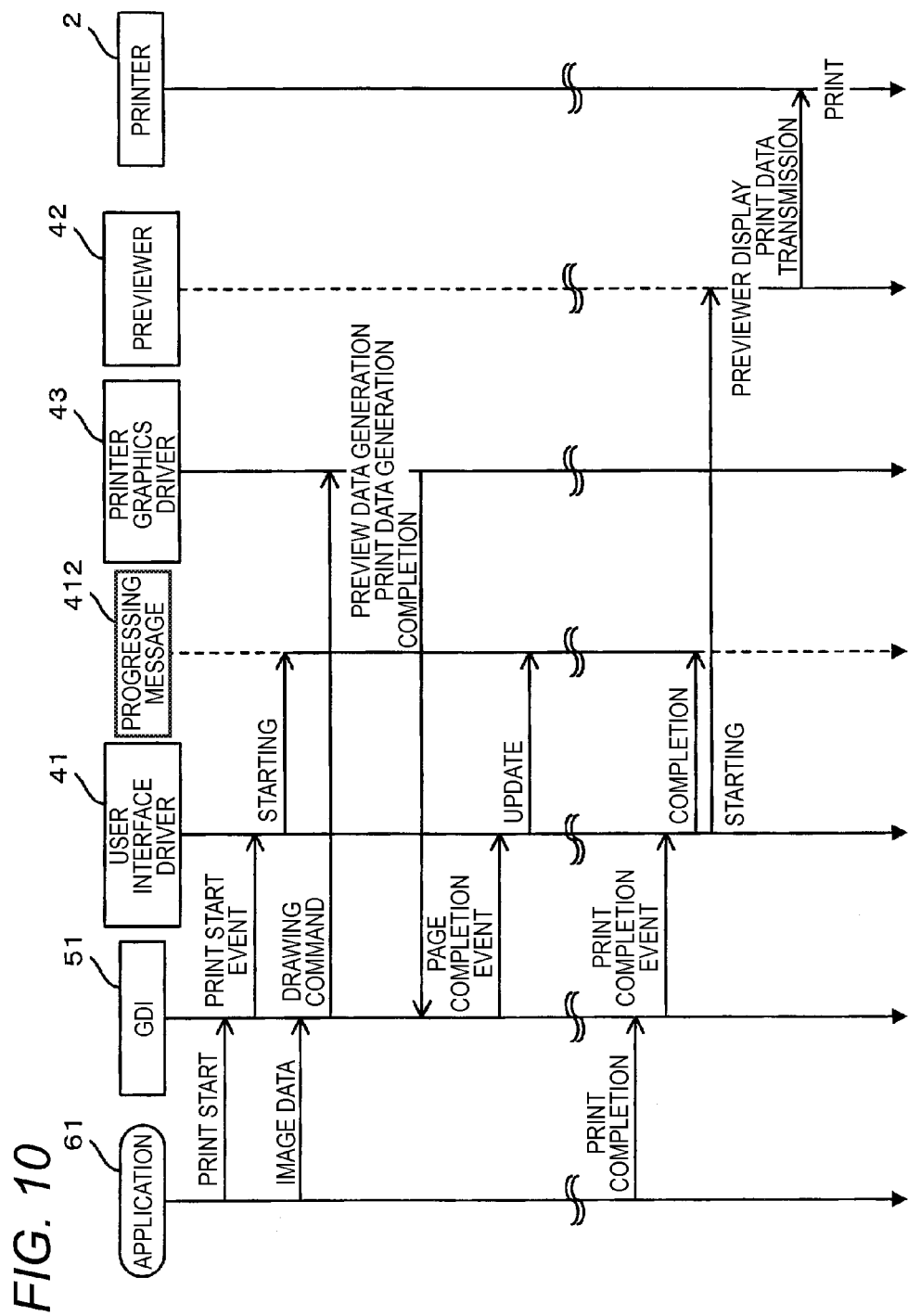
FIG. 10 shows a processing sequence of a preview function of a print system according to a first exemplary embodiment.

Incidentally, in FIG. 9, the two user interface drivers 41 and the two GDIs 51 are provided, respectively. However, the two user interface drivers and the two GDIs are shown for convenient explanations and are actually the same, respectively.

In the first exemplary embodiment, when making the print preview, the application program 61 first receives a print instruction from a user and outputs a print start notification. Then, the GDI 51 receives the print start notification from the application program 61. When the print start notification is received, the GDI 51 issues a print start event to the user interface driver 41.

When the print start event is received, the user interface driver 41 starts up the progressing message box 412 as shown in FIG. 4 and notifies the user of the generation progressing of the preview data.

After receiving the print start notification, the GDI 51 acquires image data from the application program 61. Then, the GDI 51 converts the acquired image data into bitmap data and outputs a drawing command to the printer graphics driver 43. After outputting the drawing command, the GDI 51 stands by until the printer graphics driver 43 responds.

When receiving the drawing command, the printer graphics driver 43 acquires the image data converted by the GDI 51 and generates preview data for the previewer 42 (JPEG data, in this exemplary embodiment) and print data for the printer 2 (PDL data, in this exemplary embodiment). That is, the printer graphics driver 43 generates two types of data, e.g., the preview data and the print data from the image data of one page. The print data is stored in a print data file 45, and the preview data is stored in a preview data file 46. Further, information in which a page number and a storage place of data of each page are associated is stored in the print data file 45 and the preview data file 46. The print data file 45 and the preview data file 46 are files that are provided by the printer driver 40 and are different from the RAW spool file 52 that is provided by the OS 50. When the generation of the preview data and the print data is completed, the printer graphics driver 43 transmits the generation completion to the GDI 51.

Upon receiving the reply indicating that the generation of the preview data of one page has been completed, the GDI 51 issues a page completion event to the user interface driver 41. When the page completion event is received, the user interface driver 41 updates the information indicating the progressing status that is being displayed in the progressing message box 412. For example, in the progressing message box 412 shown in FIG. 4, a page number of the page under progressing is updated. Thereby, the user is able to know the specific progressing status.

In the print system 100, the preview data and print data of one page are generated and the progressing message box 412 are updated every time when the image data of one page is received, and these processing are repeated until the processing of a final page is completed.

When the application program 61 completes the transfer of the image data of the final page, the application program outputs a print completion notification. When the print completion notification is received from the application program 61, the GDI 51 issues a print completion event to the user interface driver 41. When the print completion event is received, the user interface driver 41 ends the progressing message box 412.

Incidentally, when the GDI 51 is waiting for a response from the printer driver 40 upon the receipt of the print completion notification, e.g., when the GDI is waiting for the generation of the preview data and the like in the printer graphics driver 43 upon the receipt of the print completion notification, the GDI issues a print completion event after receiving a response from the printer driver 40. That is, after the generation of the preview data is completed, the GDI issues a print completion event.

Further, when the print completion event is received, the user interface driver 41 starts up the previewer 42. After the previewer 42 is started up or upon the previewer 42 is started up, the user interface driver 41 enables the previewer 42 to read out the whole preview data, which has been generated by the printer graphics driver 43, from the preview data file 46 and to display the preview data of a leading page in the image area 421.

After that, the previewer 42 receives a print instruction or cancel instruction from the user. When the print instruction is received from the user, the previewer 42 reads out from the print data file 45 the print data, which corresponds to the page selected as the print target by the page selection check box group 422, of the print data stored in the print data file 45, and transmits the read print data to the printer 2. That is, when the setting displaying the print preview is ON, the print data stored in the print data file 45 is transmitted to the printer 2 by an instruction from the previewer 42.

Incidentally, when displaying the print preview, the RAW spool type is still used. Thus, the OS 50 prepares the RAW spool file 52. However, the print data is not stored in the RAW spool file 52. Therefore, the print data is not transmitted from the RAW spool file 52.

[Print Processing]

Figure 11:
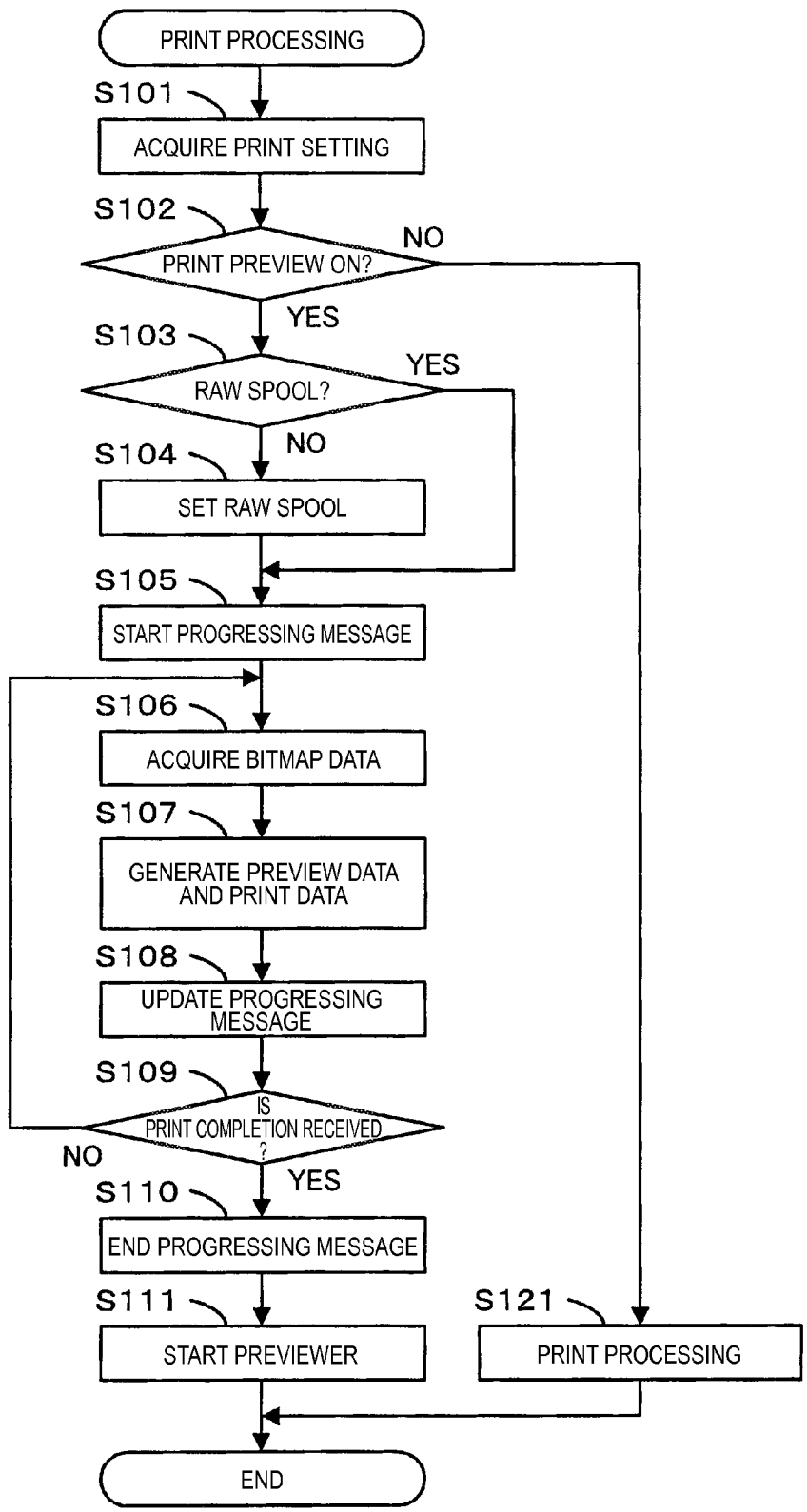
FIG. 11 is a flowchart showing a sequence of print processing of a printer driver according to the first exemplary embodiment.

Subsequently, the print processing (which is one example of a preview data generation unit, a print data generation unit, a determination unit, a control unit, a notification unit and an update unit) of implementing the print preview of the first exemplary embodiment will be described with reference to a flowchart of FIG. 11. The print processing is implemented by the OS 50 and the printer driver 40. The print processing is executed by the CPU 11 when the user inputs a print instruction through the application program 61, e.g., when the GDI 51 receives a print instruction from the application program 61.

In the print processing of the first exemplary embodiment, the GDI 51 first calls an initialization function of the printer driver 40 and acquires a print setting of a print job (S101). Then, it is determined whether the setting for displaying the print preview is ON from the acquired print setting (S102, which is one example of a determination unit).

When the setting for displaying the print preview is OFF (S102: NO), the print processing is executed without performing the preview display (S121). That is, the printer driver 40 generates and transmits the print data by the spool type designated by the user to the printer 2 without generating the preview data. Specifically, when the EMF spool type is set as the spool type, the printer driver 40 executes the print processing by using the EMF spool type (refer to FIG. 8). When the RAW spool type is set, the printer driver 40 executes the print processing by using the RAW spool type (refer to FIG. 7). After S121, the printer driver 40 ends the print processing.

When the setting for displaying the print preview is ON (S102: YES), it is determined whether the RAW spool type is set (S103). It is possible to determine whether the RAW spool type is set by determining whether the RAW spool is selected in the property screen 54 (refer to FIG. 6) of the printer 2. When the EMF spool type is set (S103: NO), the setting is changed so that the spool type becomes the RAW spool type (S104, which is one example of a control unit). That is, when the EMF spool type is used, the printer driver 40 of this exemplary embodiment does not generate the preview data. Therefore, the printer driver 40 changes the spool type into the RAW spool type and generates the preview data.

After S104 or when the RAW spool type is set (S103: YES), the printer driver 40 starts up the progressing message box 412 (S105, which is one example of a notification unit).

Then, the GDI 51 converts the image data acquired from the application program 61 into bitmap data and transfers the converted bitmap data to the printer driver 40 every one page (S106). In other words, the printer driver 40 acquires the bitmap data every one page from the GDI 51. Specifically, in S106, the GDI 51 calls a drawing function on the printer driver 40. Thus, the GDI 51 stands by until a response indicating that the drawing function ends is received from the printer driver 40.

The printer driver 40 generates preview data and print data, based on the acquired image data (S107, which is one example of a preview data generation unit and a print data generation unit). That is, the printer driver 40 performs the processing treatment for the acquired image data, as necessary. Then, the printer driver 40 compresses the processed image data into JPEG data to thus generate the preview data. Further, the printer driver 40 generates the print data, which is the PDL data, based on the processed image data. The preview data and the print data are stored in the different files, respectively. After generating the preview data and the print data, the printer driver 40 transmits the generation completion to the GDI 51.

Further, after generating the preview data and the print data, the printer driver 40 updates the message content of the progressing message box 412, depending on the generation status (S108, which is one example of an update unit).

After generating the preview data and print data of one page, the GDI 51 determines whether a print completion notification is received from the application program 61 (S109). When the print completion notification is not received (S109: NO), the printer driver 40 proceeds to S106 to acquire image data of a next page and repeats the processing from S106 to S108.

When the print completion notification is received, e.g., when the reception of the image data of all pages of the received print job is completed (S109: YES), the printer driver 40 ends the progressing message box 412 (S110). After that, the printer driver 40 starts up the previewer 42 (S111), displays the preview data and receives a print instruction. After S111, the printer driver 40 ends the print processing.

[Previewer Print Processing]

Figure 12:
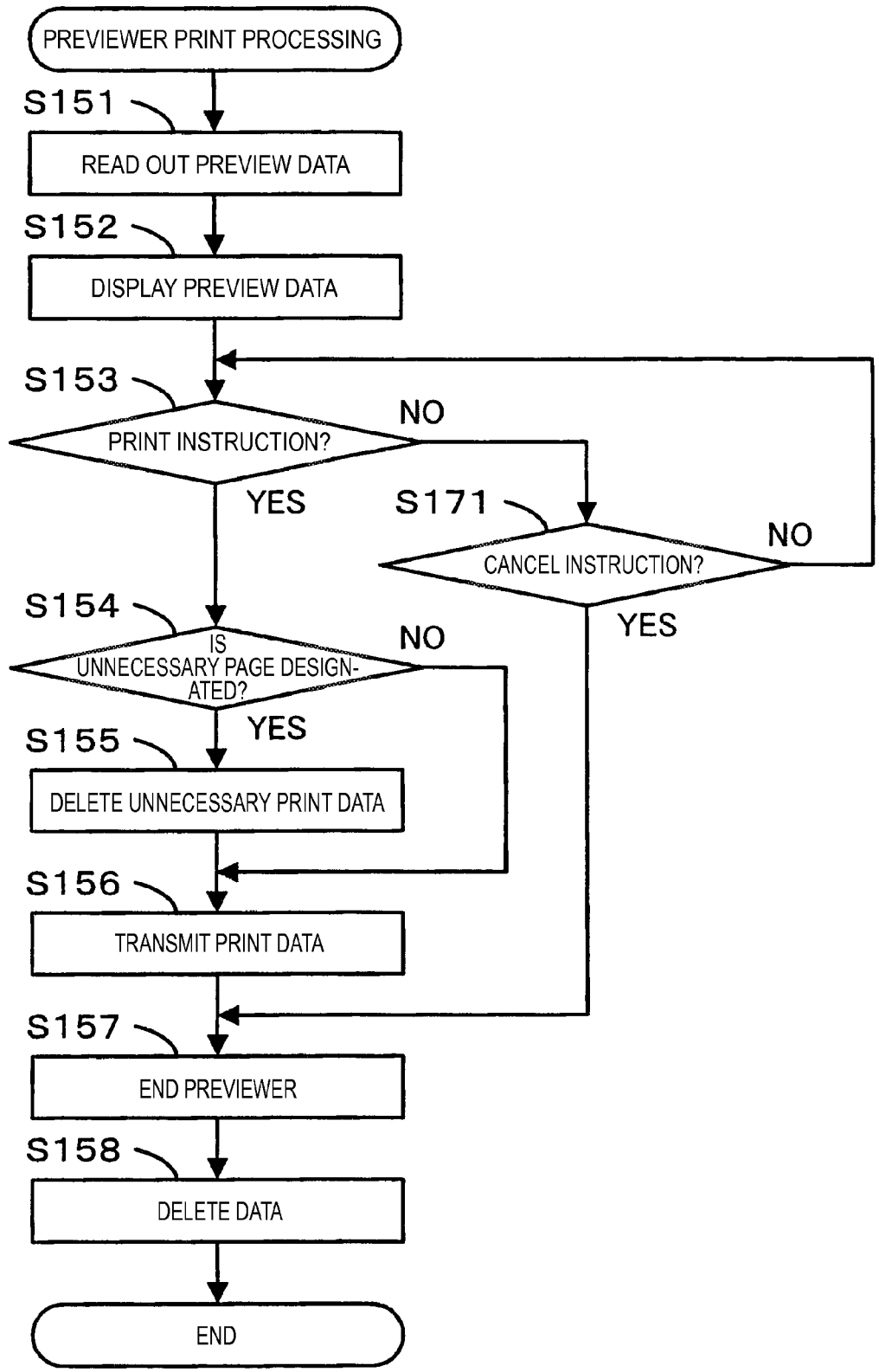
FIG. 12 is a flowchart showing a sequence of previewer print processing of a previewer according to the first exemplary embodiment.

FIG. 12 shows the previewer print processing (which is one example of a display unit and an output unit) of the previewer 42 having started up in S111. The previewer print processing is executed by the CPU 11 when the previewer 42 is started up.

In the previewer print processing of the first exemplary embodiment, the previewer 42 reads out the preview data stored in the preview data file 46, e.g., the preview data generated in S107 (S151). Then, the previewer 42 displays the read preview data (S152, which is one example of a display unit).

Then, the previewer 42 determines whether there is an input of a print instruction by a user operation (S153). That is, the previewer 42 determines whether the print execution button 423 of the previewer 42 is pressed. When there is no input of a print instruction (S153: NO), the previewer 42 determines whether there is an input of a cancel instruction by a user operation (S171). That is, the previewer 42 determines whether the cancel button 424 of the previewer 42 is pressed. When there is no input of a cancel instruction (S171: NO), the previewer 42 proceeds to S153 and waits for an input of a print instruction or cancel instruction.

When there is an input of a print instruction (S153: YES), the previewer 42 determines whether an unnecessary page is designated (S154). It is possible to determine whether there is an unnecessary page by the check status of the page selection check box group 422 at a point of time at which the print execution button 423 is pressed. That is, the previewer 42 determines a non-checked box of the page selection check box group 422 as an unnecessary page. When an unnecessary page is designated (S154: YES), the previewer 42 deletes print data, which corresponds to a page designated as the unnecessary page, of the print data stored in the print data file 45 (S155).

After S155 or when an unnecessary page is not designated (S154: NO), the previewer 42 transmits all the print data remaining in the print data file 45 to the printer 2 (S156, which is one example of an output unit). Upon receiving the print data, the printer 2 performs a printing, based on the print data.

Figure 13:
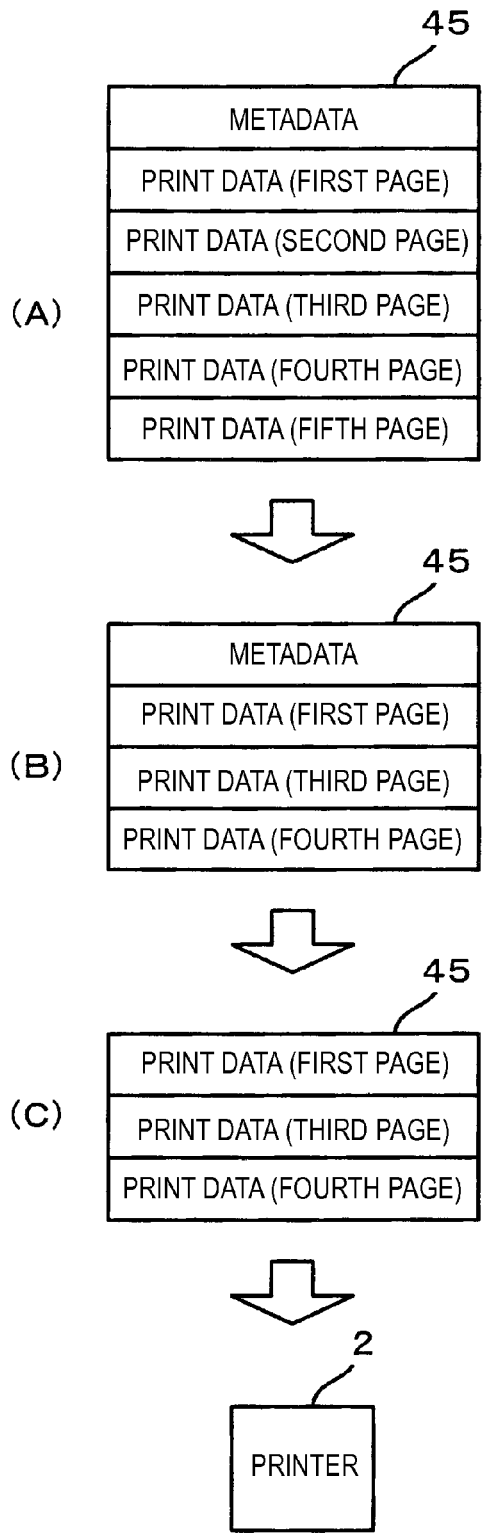
FIG. 13 shows a data flow when transmitting print data from the previewer.

FIG. 13 shows a data flow when transmitting the print data from the previewer 42. In FIG. 13, it is assumed that a total number of pages of a print job is 5 (five). As shown in FIG. 13(A), at a time at which the previewer 42 is started up, in addition to the print data of all pages of a print job, meta data, which is the information in which a page number and a storage place of data of each page are associated, is stored in the print data file 45. After that, in S155, the print data designated as the unnecessary page is deleted, as shown in FIG. 13(B). Then, in S156, as shown in FIG. 13(C), the meta data is deleted and the remaining print data is transmitted to the printer 2.

After S156 or when a cancel instruction is input (S171: YES), the printer driver 40 ends the previewer 42 (S157). Then, the printer driver 40 deletes all of the preview data and print data generated in S107 (S158). After S158, the print driver 40 ends the previewer print processing of FIG. 12 and returns to the print processing of FIG. 11 to thus end the print processing.

As described above, the printer driver 40 of this exemplary embodiment implements the print preview by using the RAW spool type. That is, when displaying the print image on the previewer 42, the printer driver 40 of this exemplary embodiment generates the preview data in response to the drawing command that is issued whenever the GDI 51 acquires each image data of the print job. Then, in response to the print completion event that is issued after the GDI 51 receives the image data of all pages of the print job and receives the generation completion of the preview data, the printer driver 40 starts up the previewer 42. Upon the previewer 42 is started up, the previewer 42 reads out and displays the preview data stored in the preview data file 46. Like this, since the previewer 42 is started up after the preview data is generated, it is not necessary to request the generation of the preview data. Thus, it is not necessary to make inquires about the generation status of the preview data many times.

On the other hand, according to the related-art configuration of implementing the print view by using the EMF spool type, when displaying a print image on the previewer, the previewer is started up in response to a print start event notifying that the GDI 51 starts receiving the image data. It is not clear whether there is the preview data when the previewer is started up. Therefore, the previewer is configured to issue a request for generation of preview data and to receive a notification indicating the generation completion of the preview data.

As described above, the printer driver 40 of this exemplary embodiment does not require issuing the request for generation of preview data and receiving the notification indicating the generation completion of the preview data by the previewer, which are required in the related-art configuration. Further, the configurations of receiving the request for generation from the previewer and notifying the generation completion of the preview data are not required. Hence, the processing according to the exemplary embodiment is simpler, compared to the related-art configuration.

Further, in the related-art configuration, a module for receiving the request for generation from the previewer and a module for notifying the generation completion of the preview data (print processor customized for preview) are required. On the other hand, the printer driver 40 according to this exemplary embodiment does not require such modules. Also in this point, the processing according to the exemplary embodiment is simple.

Second Exemplary Embodiment

Figure 14:
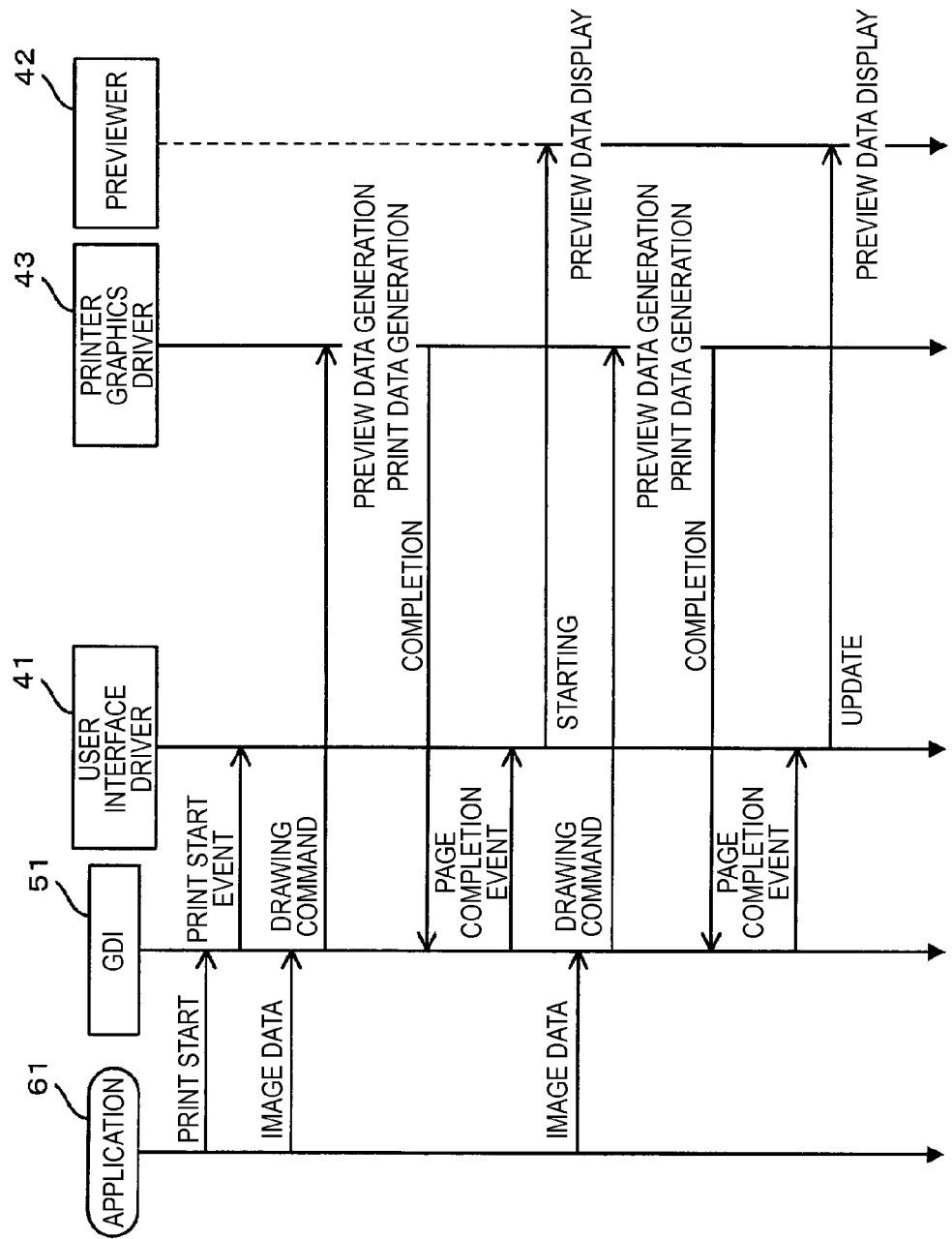
FIG. 14 shows a processing sequence of a preview function of a print system according to a second exemplary embodiment.

Subsequently, a printing sequence of displaying the print preview and then transmitting the print data to the printer 2 according to a second exemplary embodiment will be described with reference to a sequence diagram of FIG. 14. In this exemplary embodiment, the previewer 42 is started up when the generation of the preview data of one page is completed. This point is different from the first exemplary embodiment in which the previewer 42 is started up when the generation of the preview data of all pages of the print job is completed.

In the second exemplary embodiment, when executing the print preview, the application program 61 first receives a print instruction from the user and outputs a print start notification. Then, after receiving the print start notification, the GDI 51 acquires image data from the application program 61. The GDI 51 converts the acquired image data into bitmap data and outputs a drawing command to the printer graphics driver 43.

When the drawing command is received, the printer graphics driver 43 acquires the image data converted by the GDI 51 and generates preview data for the previewer 42 and print data for the printer 2. The print data is stored in the print data file 45, and the preview data is stored in the preview data file 46. When the generation of the preview data and print data is completed, the printer graphics driver 43 transmits the completion to the GDI 51.

When the response indicating that the generation of the preview data of one page is completed is received, the GDI 51 issues a page completion event to the user interface driver 41. After the page completion event is received, the user interface driver 41 starts up the previewer 42 when the page is a leading page, e.g., when the previewer 42 is not started up. The user interface driver 41 enables the previewer 42 to read out the whole preview data, which has been generated by the printer graphics driver 43, from the preview data file 46 after the previewer 42 is started up or upon the previewer 42 is started up and then to display the preview data of the leading page in the image area 421.

On the other hand, after receiving the page completion event, the user interface driver 41 issues an update instruction to the previewer 42 when the previewer 42 is operating. Upon receiving the update instruction, the previewer 42 reads out the preview data, which is not being displayed, of the preview data stored in the preview data file 46. Then, a check box corresponding to the newly read preview data is added to the page selection check box group 422 of the previewer 42. The print instruction from the previewer 42 thereafter is the same as the first exemplary embodiment.

[Print Processing]

Figure 15:
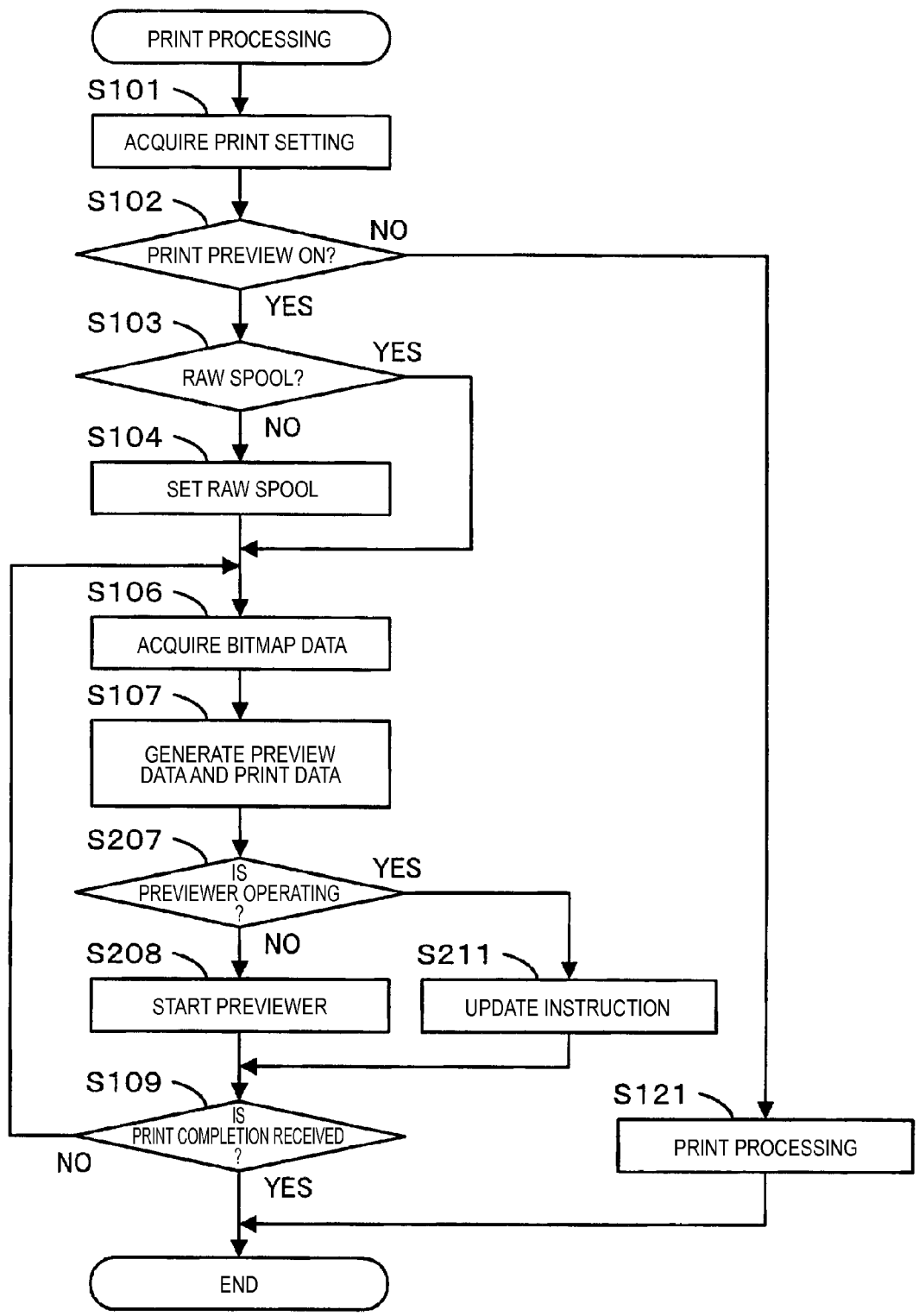
FIG. 15 is a flowchart showing a sequence of print processing of a printer driver according to the second exemplary embodiment.

Subsequently, the print processing of implementing the print preview of the second exemplary embodiment will be described with reference to a flowchart of FIG. 15. Incidentally, the same processing as the first exemplary embodiment is indicated with the same reference numeral and the description thereof is omitted.

In the print processing of the second exemplary embodiment, the processing from S101 to S104 is the same as the first exemplary embodiment. After S104 or when the RAW spool type is set (S103: YES), the printer driver 40 acquires the image data every one page from the GDI 51 without displaying the progressing message (S106).

Based on the acquired image data, the printer driver 40 generates preview data and print data (S107, which is one example of a preview data generation unit and a print data generation unit). After the generation of the preview data and print data is completed, the printer driver 40 transmits the completion to the GDI 51.

After generating the preview data and print data of one page, the printer driver 40 determines whether the previewer 42 is operating (S207). When it is determined that the previewer 42 is not operating (S207: NO), the printer driver 40 starts up the previewer 42 (S208). On the other hand, when the previewer 42 is operating (S207: YES), the printer driver 40 outputs an update instruction to the previewer 42 (S211).

After S208 or S211, the printer driver 40 determines whether a print completion notification is received from the application program 61 (S109). When a print completion notification is not received (S109: NO), the printer driver 40 proceeds to S106, acquires image data of a next page and repeats the processing from S106 to S208 (or S211). When a print completion notification is received (S109: YES), the printer driver 40 ends the print processing.

[Previewer Print Processing]

Figure 16:
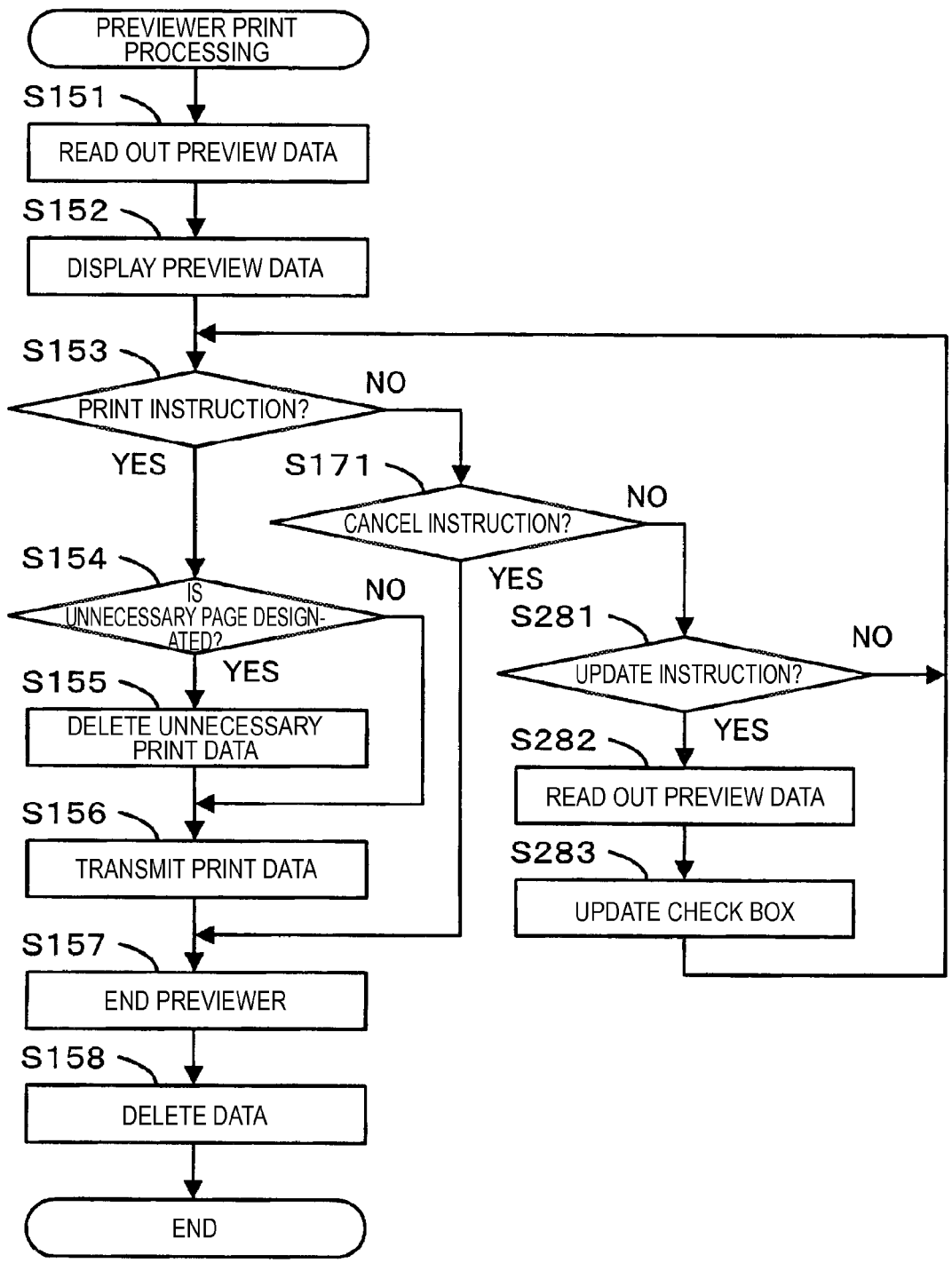
FIG. 16 is a flowchart showing a sequence of previewer print processing of a previewer according to the second exemplary embodiment.

FIG. 16 shows the previewer print processing (which is one example of a display unit and an output unit) of the previewer 42 having been started up in S208. Incidentally, the same processing as the first exemplary embodiment is indicated with the same reference numeral and the description thereof is omitted.

In the previewer print processing of the second exemplary embodiment, the previewer 42 first reads out the preview data stored in the preview data file 46 (S151). In the second exemplary embodiment, when the preview data of a first page is acquired, the previewer 42 is started up immediately, so that the preview data of a first page is read out. Then, the previewer 42 displays the read preview data (S152, which is one example of a display unit).

Then, the previewer 42 determines whether there is a print instruction or cancel instruction by a user operation (S153, S171). Further, the previewer 42 determines whether there is an update instruction by the user interface driver 41 (S281).

When there is an update instruction by the user interface driver 41 (S281: YES), the previewer 42 reads out the preview data newly stored in the preview data file 46 (S282). Then, the previewer 42 displays the check box corresponding to the newly read preview data. Thereby, the newly generated preview data is reflected in the previewer 42.

Incidentally, the processing that is performed when a print instruction is received (S153: YES) or the processing when a cancel instruction is received (S171: YES) is the same as the first exemplary embodiment.

The printer driver 40 of the second exemplary embodiment starts up the previewer 42 in response to the print completion event that is issued after the GDI 51 completes the reception of the image data of the first page and also receives the generation completion of the preview data. Upon the previewer 42 is started up, the previewer 42 reads out and displays the preview data stored in the preview data file 46. Further, in response to the print completion event that is issued after the GDI 51 completes the reception of the image data of another page and also receives the generation completion of the preview data, the printer driver 40 updates the previewer 42. Like this, also in the second exemplary embodiment, the previewer 42 is started up after the preview data is generated. Hence, it is not necessary to request the generation of the preview data.

Incidentally, in the second exemplary embodiment, the input of the print instruction to the previewer 42 may be limited until the generation of the preview data of all pages of the print job is completed, and the limit may be released when the generation of the preview data of all pages of the print job is completed. Further, the progressing may be displayed in the previewer 42 until the preview data of all pages is prepared. Also, the display completion of the preview data may be displayed in the previewer 42 after the preview data of all pages is prepared.

As specifically described above, according to the printer driver 40 of the first and second exemplary embodiments, when displaying the print preview, the print job using the RAW spool type is targeted, and the generation of the preview data starts when the drawing command is received from the GDI 51 before the previewer 42 is started up. The previewer 42 is started up after the generation completion of the preview data is received, so that the previewer 42 reads out the preview data stored in the preview data file 46 and displays the read preview data. That is, when displaying the preview data on the previewer 42, it is not necessary to issue the request for generation of the preview data from at least the previewer 42. As a result, the processing according to the exemplary embodiments is simpler, compared to the related-art configuration.

Incidentally, the above-described exemplary embodiments are just examples and do not limit the invention. Therefore, the invention can be variously improved and modified without departing from the scope of the invention. For example, the printing apparatus is not limited to the printer, and may be a copier, a FAX, a complex machine having a printing function, and the like. Further, the information processing apparatus is not limited to the PC, and may be a workstation, a smartphone, a PDA and the like.

Further, above-described exemplary embodiments, the previewer 42 is included in the printer driver 40. However, when the previewer 42 is specialized to display the preview data, it is not necessarily for the previewer 42, to be a dedicated module for the printer driver 40, and an arbitrary module may be used insomuch as it can read out the preview data. For example, when the file format of the preview data is a bitmap file, a viewer program that is provided by the OS 50 may be started up, and the preview data may be displayed on the viewer program.

Further, the above-described exemplary embodiments, every time when the preview data of one page is generated, progressing status thereof is updated. However, the invention is not limited thereto. For example, a state that the preview data is being generated may be displayed, the progressing thereof may not be displayed and the message content may not be updated. Alternatively, the notification by the progressing message box 412, is not necessarily required, that is, the function of displaying the progressing while the preview data is being generated may not be provided. The less the processing for the progressing message box 412, the processing becomes simpler. On the other hand, the display the progressing message box 412 may reduce the anxiety of the user.

Further, in the above-described exemplary embodiments, the print instruction can be input from the previewer 42. However, the function of the previewer 42 may be specialized only to display the preview data, and the print instruction may not be directly input from the previewer 42, in this case, since the previewer 42 does not handle the preview, it is not necessary to generate the print data in S107 of the print processing. Further, when performing the printing, the print instruction is again input from the application program 61 and the setting of displaying the print preview becomes OFF at that time.

Further, the previewer 42 of the above-described exemplary embodiments display the preview data every one page. However, the previewer 42 may be configured to collectively display a plurality of pages. Further, the previewer may be configured to zoom in or out the preview data.

Further, in the above-described exemplary embodiments, the printing is enabled using the EMF spool type. However, only the RAW spool type may be supported. In this case, S103 and S104 of the print processing are not required.

Further, in the above-described exemplary embodiments, the preview data is the bitmap or compression file thereof. However, the invention is not limited thereto. For example, the preview data may be an XML or PDF file.

Further, the processing disclosed in the above-described exemplary embodiments may be executed by hardware such as a single CPU, a plurality of CPUs, an ASIC and the like or a combination thereof. Also, the processings disclosed in the above exemplary embodiments may be implemented in various aspects such as a recording medium having a program for executing the processing therein, a method and the like.

What is claimed is:

1. A non-transitory computer-readable medium having a computer program stored thereon and readable by a processor that is installed in an information processing apparatus,
wherein the information processing apparatus comprises:
the processor;
a display interface to which a display is connected;
a user interface; and
a printer interface,
wherein the computer program includes a driver and a previewer,
wherein the driver, when executed by the processor, causes the information processing apparatus to:
acquire a print setting of a print job;
determine whether a print preview setting, included in the print setting, indicates that a preview is to be displayed;
determine a spool type of the print job identified in the print job, the spool type being selectable from among a plurality of types including a RAW spool format;
change the spool type of the print job to the RAW spool format based on a determination that the print preview setting indicates that the preview is to be displayed and a determination that the spool type of the print job is set to another spool type;
acquire image data for generating the print job using the RAW spool format;
generate preview data from the image data, wherein the preview data is image data for displaying the preview;
store the preview data in a preview data file;
generate print data based on the image data;
store the print data in a print data file which is different from a RAW spool file which is a file provided by an operating system of the information processing apparatus;
start up the previewer after a portion of the preview data for at least one page is generated, and
wherein the previewer, when executed by the processor, causes the information processing apparatus to:
control the display interface to display the preview data, stored in the preview data file, on a preview screen of the display;
receive, through the user interface, a print instruction to print in accordance with the preview data displayed on the preview screen; and
output at least a portion of the print data from the information processing apparatus to a printing apparatus through the printer interface in response to the print instruction, wherein the at least the portion of the print data comprises data, in the print data file, that corresponds to the preview data.

2. The non-transitory computer-readable medium according to claim 1,
wherein the computer program, when executed by the processor, causes the information processing apparatus to:
generate the print data with a spool format designated in the print job in response to determining that the print preview setting does not indicate that the preview is to be displayed.

3. The non-transitory computer-readable medium according to claim 1,
wherein the at least the portion of the print data that is output corresponds to a portion of the preview data for a particular sheet among a plurality of sheets of a document.

4. The non-transitory computer-readable medium according to claim 3, wherein the computer program, when executed by the processor, causes the information processing apparatus to:
determine, using the previewer, whether at least one of the plurality of sheets is not to be printed; and
delete, from the print data file, a portion of the print data that corresponds to the at least one of the plurality of sheets.

5. The non-transitory computer-readable medium according to claim 1,
wherein the print data is page description language (PDL) data.

6. The non-transitory computer-readable medium according to claim 1,
wherein the preview data is bitmap data or compression data thereof.

7. The non-transitory computer-readable medium according to claim 1,
wherein the driver, when executed by the processor, causes the information processing apparatus to start up the previewer upon generating all preview data of the print job.

8. The non-transitory computer-readable medium according to claim 1,
wherein the computer program, when executed by the processor, causes the information processing apparatus to:
notify a user that the preview data is being generated after the image data of the print job using the RAW spool format is acquired until generation of the preview data is completed.

9. The non-transitory computer-readable medium according to claim 8,
wherein notifying the user that the preview data is being generated comprises progressing of a generation status of the preview data throughout the generation of the preview data, and
wherein the computer program, when executed by the computer, causes the information processing apparatus to:
update the generation status every time a portion of the preview data for at least one page is generated.

10. An information processing apparatus comprising:
a processor;
a display interface to which a display is connected;
a user interface;
a printer interface; and
a memory storing computer-readable instructions including a driver and a previewer,
wherein the driver, when executed by the processor, causes the information processing apparatus to:
acquire a print setting of a print job;
determine whether a print preview setting, included in the print setting, indicates that a preview is to be displayed;
determine a spool type of the print job identified in the print job, the spool type being selectable from among a plurality of types including a RAW spool format;
change the spool type of the print job to the RAW spool format based on a determination that the print preview setting indicates that the preview is to be displayed and a determination that the spool type of the print job is set to another spool type;

acquire image data for generating the print job using the RAW spool format;

generate preview data from the image data, wherein the preview data is image data for displaying a preview;

store the preview data in a preview data file;

generate print data based on the image data;

store the print data in a print data file which is different from a RAW spool file which is a file provided by an operating system of the information processing apparatus;

start up the previewer after a portion of the preview data for at least one page is generated, and wherein the previewer, when executed by the processor, causes the information processing apparatus to:

control the display interface to display the preview data, stored in the preview data file, on a preview screen of the display;

receive, through the user interface, a print instruction to print in accordance with the preview data displayed on the preview screen; and output at least a portion of the print data from the information processing apparatus to a printing apparatus through the printer interface in response to the print instruction, wherein the at least the portion of the print data comprises data, in the print data file, that corresponds to the preview data.

11. The information processing apparatus of claim 10, wherein the at least the portion of the print data that is output corresponds to a portion of the preview data for a particular sheet among a plurality of sheets of a document.

12. The information processing apparatus of claim 10, wherein the preview data file is different from the RAW spool file.

13. The information processing apparatus of claim 10, wherein the preview data file is different from the print data file.

* * * * *